US012678777B2

(12) United States Patent
Yu et al.

(10) Patent No.: US 12,678,777 B2
(45) Date of Patent: Jul. 14, 2026

(54) CATALYST FOR ADDITION REACTION OF ALKYLENE OXIDE AND USE THEREOF

(71) Applicants: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(72) Inventors: Fengping Yu, Shanghai (CN); Wenjun He, Shanghai (CN); Ming Jin, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

( * ) Notice: Subject to any disclaimer, the term of this patent is extended or adjusted under 35 U.S.C. 154(b) by 765 days.

(21) Appl. No.: 17/763,031

(22) PCT Filed: Sep. 24, 2020

(86) PCT No.: PCT/CN2020/117335

§ 371 (c)(1),
(2) Date: Mar. 23, 2022

(87) PCT Pub. No.: WO2021/057835

PCT Pub. Date: Apr. 1, 2021

(65) Prior Publication Data

US 2022/0355285 A1 Nov. 10, 2022

(30) Foreign Application Priority Data

Sep. 24, 2019 (CN) ........................ 201910905824.6

(51) Int. Cl.

| | |
|---|---|
| ***C08F 283/12*** | (2006.01) |
| ***B01J 31/08*** | (2006.01) |
| ***B01J 37/30*** | (2006.01) |
| *B82Y 30/00* | (2011.01) |

(52) U.S. Cl.

CPC ............... *B01J 31/08* (2013.01); *B01J 37/30* (2013.01); *C08F 283/124* (2013.01); *B01J 2231/34* (2013.01); *B82Y 30/00* (2013.01)

(58) Field of Classification Search

None

See application file for complete search history.

(56) References Cited

U.S. PATENT DOCUMENTS

| | | | | |
|---|---|---|---|---|
| 6,100,417 | A * | 8/2000 | Lichtenhan | C07F 7/21 556/460 |
| 2012/0205315 | A1* | 8/2012 | Liu | B01J 20/3257 556/460 |
| 2014/0128495 | A1 | 5/2014 | Wang et al. | |
| 2018/0355116 | A1* | 12/2018 | Wunder | C08G 77/58 |
| 2019/0049352 | A1 | 2/2019 | Liu et al. | |

FOREIGN PATENT DOCUMENTS

| | | | | |
|---|---|---|---|---|
| CN | 102336736 | A | 2/2012 | |
| CN | 103495437 | A | 1/2014 | |
| CN | 104324749 | A | 2/2015 | |
| CN | 105330780 | A | 2/2016 | |
| CN | 107556481 | A | 1/2018 | |
| CN | 109569717 | A | 4/2019 | |
| CN | 109575162 | * | 4/2019 | |
| CN | 109575292 | A | 4/2019 | |
| CN | 109590029 | A | 4/2019 | |
| WO | WO2015118105 | * | 8/2015 | |
| WO | WO-2015118105 | A1 * | 8/2015 | B01J 20/3078 |

OTHER PUBLICATIONS

Shan, et al. "Preparation and evaluation of a novel hybrid monolithic column . . . ". Journal of Chromatography A. 1375, 101-109 (2015) (Year: 2015).*

Search Report issued on Sep. 15, 2023, and Written Opinion issued on Sep. 15, 2023, by the Intellectual Property Office of Singapore in corresponding Singapore Patent Application No. 11202203011S. (8 pages).

Extended European Search Report dated Sep. 29, 2023, issued by the European Patent Office in corresponding European Application No. 20869127.9. (6 pages).

International Search Report (PCT/ISA/210) with English translation and Written Opinion (PCT/ISA/237) mailed on Dec. 23, 2020, by the China National Intellectual Property Administration as the International Searching Authority for International Application No. PCT/CN2020/117335.

* cited by examiner

*Primary Examiner* — Sheng H Davis

(74) *Attorney, Agent, or Firm* — Panitch Schwarze Belisario & Nadel LLP

(57) ABSTRACT

The present invention provides a catalyst for an addition reaction of alkylene oxide, the catalyst comprises a nanocomposite ion-exchange resin having a structural formula of P-$Im^+$-$M^-$, wherein P is a nanocomposite resin matrix, $Im^+$ is a cation derived from 5-6 membered heterocycle containing at least one nitrogen atom such as imidazolium cation, pyrazolium cation, pyrrolidinium cation, piperidinium cation, piperazinium cation, pyrimidinium cation, pyrazinium cation, pyridazinium cation, triazinium cation, and $M^-$ is an anion. The catalyst of the present invention can be used in the addition reaction of alkylene oxide and carbon dioxide. The catalyst has high wear resistance, high swelling resistance, and high activity. The products after the reaction are easy to separate, and the catalyst can be used continuously many times.

18 Claims, 1 Drawing Sheet

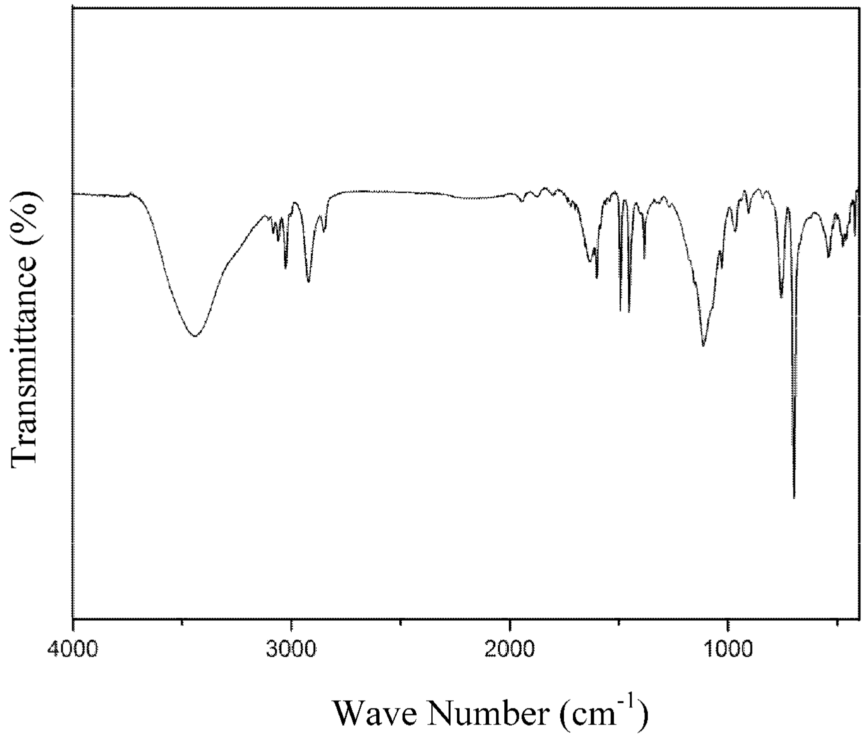
Transmittance (%)
4000
3000
2000
1000
Wave Number ($cm^{-1}$)

CATALYST FOR ADDITION REACTION OF ALKYLENE OXIDE AND USE THEREOF

TECHNICAL FIELD

The present invention relates to a catalyst for addition reaction of alkylene oxide and use thereof, in particular to a nanocomposite ion-exchange resin catalyst.

BACKGROUND TECHNOLOGY

Alkylene carbonates such as ethylene carbonate and propylene carbonate are excellent solvents and fine chemical intermediates with a wide range of uses. As an excellent high boiling solvent and an organic synthesis intermediate, ethylene carbonate is widely used as solvent in textile, printing, polymer synthesis, and electrochemistry. It can also be used as raw materials of cosmetics and drugs and an intermediate of the corresponding diol. In recent years, ethylene carbonate has been used in the production of lithium battery electrolyte and dimethyl carbonate, and the use of aliphatic polycarbonate and its various copolymers as biodegradable materials has attracted much attention to its industrial production.

The traditional production method of ethylene carbonate is the phosgene method. Phosgene has high toxicity and serious pollution, and the process has the disadvantages of long process flow, low yield, high cost, and the like. Using carbon dioxide and ethylene oxide as raw materials to directly prepare ethylene carbonate under the action of the corresponding catalyst is a new way of green environmental protection. The process can directly use carbon dioxide, a greenhouse gas, to alleviate the problem of carbon dioxide emissions.

Currently known homogeneous catalyst systems that can be used for addition reaction of carbon dioxide and epoxy compounds include catalytic systems such as quaternary ammonium salts, quaternary phosphonium salts, transition metal complexes, main group element complexes and alkali metal salts, ionic liquids, and supercritical carbon dioxide.

He Liangnian et al. (Green Chem., 2003, 5, 92-94) developed a class of phosphonium salt catalysts and synthesized ethylene carbonate with the catalyst of $Rf_3RPI$ ($Rf{=}R{=}C_4F_9C_2H_4$; $Rf{=}R{=}C_6F_{13}C_2H_4$; $Rf{=}C_6F_{13}C_2H_4$, R=Me; $Rf{=}C_8F_{17}C_2H_4$, R=Me; P is phosphorus, I is iodine) in the supercritical carbon dioxide. The catalyst contains a relatively long fluorine chain and has relatively good solubility in carbon dioxide, while its solubility in the product is relatively small, which is beneficial to the product separation. The in-situ regeneration of the catalyst in the supercritical state and the recycling use of the catalyst were realized. The yield of ethylene carbonate reached more than 90%, but the reaction period was too long (24 hours were needed).

Kim et al. studied the effect of homogeneous catalytic systems such as zinc halides with 1-alkyl-3-methyl-imidazolium halides and phosphine-containing ligands on the reaction (Angew. Chem. Int. Ed. 39 (2000) 4096-4098, Chem. Eur. J. 9 (2003) 678-686, J. Catal. 232 (2005) 80-84). After the reaction, the homogeneous catalyst needed to be separated from the product, and the separation of the product from the homogeneous catalyst by distillation could severely decompose alkylene carbonates.

The characteristics of the homogeneous catalytic system itself determine that the homogeneous process has disadvantages such as the difficulty in product separation, the large amount of catalyst and the difficult recycling, and the environmental pollution. Compared with homogeneous catalysts, heterogeneous catalysts are beneficial to the subsequent separation of products and catalysts, and the catalysts can be easily regenerated and reused many times. As the support of the heterogeneous catalytic system, molecular sieves, silica gels, ion-exchange resins, polyethylene glycol, poly(4-vinylpyridine), chitosan, and the like are commonly used.

Xiao et al. (Appl. Catal. A 279 (2005) 125-129) reported the supported zinc halide catalyst, and the support was poly(4-vinylpyridine) or chitosan. In this system, 1-butyl-3-methylimidazolium bromide must also be homogeneously used as co-catalyst, and the catalytic activity dropped significantly after being recycled. Van Kruchten et al. reported in CN 101511810A a zinc halide catalyst supported on a solid support, where the support was a quaternary-phosphonium or quaternary-ammonium ion-exchange resin, and the activity of the catalytic system decreased rapidly after being recycled.

Lv Xiaobing et al. studied the continuous process of ethylene carbonate fixed bed with Salen (Co) supported on silica gel MCM-41 as catalyst. With the addition of n-butylammonium bromide as co-catalyst, the conversion of ethylene oxide could reach 85.6%.

It can be seen that although the heterogeneous catalytic system has many advantages, however the wear resistance, the swelling resistance, and the activity of the catalyst still need to be further improved. It is very important to develop a catalytic system with high activity and easy separation.

SUMMARY OF THE INVENTION

In order to solve the problems existing in the prior art, in the first aspect of the present invention is provided a catalyst for addition reaction of alkylene oxide, the catalyst comprises a nanocomposite ion-exchange resin having a structural formula of $P\text{-}Im^+\text{-}M^-$, wherein P is a nanocomposite resin matrix, $Im^+$ is a cation derived from 5-6 membered heterocycle containing at least one nitrogen atom such as imidazolium cation, pyrazolium cation, pyrrolidinium cation, piperidinium cation, piperazinium cation, pyrimidinium cation, pyrazinium cation, pyridazinium cation, triazinium cation (for example a cation derived from 5-6 membered heteroarene containing at least one nitrogen atom, such as imidazolium cation, pyrazolium cation, pyrimidinium cation, pyrazinium cation, pyridazinium cation, triazinium cation), and $M^-$ is an anion. The catalyst of the present invention can be used in the addition reaction of alkylene oxide and carbon dioxide. The catalyst has high wear resistance, high swelling resistance, and high activity. The products after the reaction are easy to separate, and the catalyst can be used continuously many times.

In the second aspect of the present invention is provided a method for an addition reaction of alkylene oxide and carbon dioxide.

According to the first aspect of the present invention, the catalyst comprises a nanocomposite ion-exchange resin having a structural formula of $P\text{-}Im^+\text{-}M^-$, wherein P is a nanocomposite resin matrix, $Im^+$ is a cation derived from 5-6 membered heterocycle containing at least one nitrogen atom such as imidazolium cation, pyrazolium cation, pyrrolidinium cation, piperidinium cation, piperazinium cation, pyrimidinium cation, pyrazinium cation, pyridazinium cation, triazinium cation (for example a cation derived from 5-6 membered heteroarene containing at least one nitrogen atom, such as imidazolium cation, pyrazolium cation, pyrimidinium cation, pyrazinium cation, pyridazinium cation, triazinium cation), $M^-$ is an anion.

According to some embodiments of the present invention, the nanocomposite resin matrix comprises a structure fragment represented by formula I and a structure fragment of —CH(POSS)—$CH_2$—, Formula I

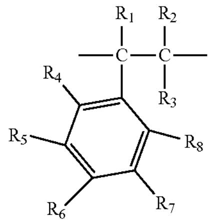

In formula I, $R_1$-$R_8$ are identical to or different from each other, and each independently selected from hydrogen and $C_1$-$C_6$ alkyl, preferably selected from hydrogen, methyl, ethyl, propyl, and butyl; POSS is a polyhedral oligomeric silsesquioxane, which has a general formula of $(—SiO_{1.5})_m$, and m is 6, 8, 10, or 12.

According to some embodiments of the present invention, the catalyst comprises the following structure:

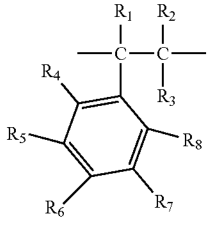

Wherein $R_1$-$R_3$ are identical to or different from each other, and each independently selected from hydrogen and $C_1$-$C_6$ alkyl;

$R_4$-$R_8$ are each independently selected from hydrogen, $C_1$-$C_6$ alkyl, and $CH_2Im^+$-$M^-$, and at least one of $R_4$-$R_8$ is $CH_2Im^+$-$M^-$, preferably, $R_4$-$R_8$ are each independently selected from hydrogen and $CH_2Im^+$-$M^-$, and at least one of $R_4$-$R_8$ is $CH_2Im^+$-$M^-$.

According to some embodiments of the present invention, the catalyst comprises a structure fragment of —CH-(Ph-$CH_2$-$Im^+$-$M^-$)-$CH_2$—.

According to some embodiments of the present invention, said $M^-$ is one or more of halide ions and organic acid radical ions.

According to some embodiments of the present invention, said $M^-$ is one or more of a fluoride ion, a chloride ion, a bromide ion, an iodide ion, an acetate group, a formate group, and a bioxalate group.

According to some embodiments of the present invention, the mass content of POSS in the nanocomposite resin matrix P is 0.1-10%, for example 0.1%, 0.2%, 0.5%, 1.0%, 1.2%, 1.5%, 2.0%, 2.5%, 3.0%, 3.5%, 4.0%, 4.3%, 4.5%, 5.0%, 5.5%, 6.0%, 7.0%, 8.0%, 9.1%, 9.5%, 10% and an arbitrary value in between.

According to some embodiments of the present invention, the mass content of POSS in the nanocomposite resin matrix P is 0.2-5%.

According to some embodiments of the present invention, the mass content of POSS in the nanocomposite resin matrix P is 2-5%.

In the present invention, the structural formula P-$Im^+$-$M^-$ represents a nanocomposite resin matrix P modified with $Im^+$ and $M^-$.

According to some embodiments of the present invention, in the infrared spectrum of the nanocomposite resin matrix P, the characteristic absorption peak at 1111 $cm^{-1}$ is attributed to the stretching vibration absorption peak of the Si—O—Si skeleton in the silsesquioxane.

According to some embodiments of the present invention, a process for preparing the catalyst comprises the following steps:

S1: polymerizing a styrene-based monomer, a cross-linking agent, and a polyhedral oligomeric silsesquioxane in the presence of an initiator to obtain a nanocomposite resin matrix P;

S2: subjecting the nanocomposite resin matrix P obtained in step S1 to a chloromethylation reaction, an imidazolation reaction, and an ion-exchange reaction.

According to some embodiments of the present invention, the nanocomposite resin matrix P is a nanocomposite copolymer obtained by in-situ copolymerization of a styrene-based monomer, a cross-linking agent, and a nano-material.

According to some embodiments of the present invention, said nano-material is at least one of a vinyl-containing silsesquioxane, a hydrogen-containing polysilsesquioxane, an alkoxy-containing polysilsesquioxane, and an epoxy-containing polysilsesquioxane.

According to some embodiments of the present invention, said styrene-based monomer is one or more of styrene-based monomers represented by formula II;

Formula II

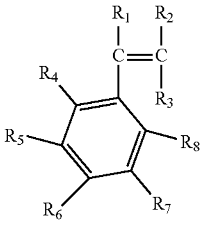

In formula II, $R_1$-$R_8$ are identical to or different from each other, and each independently selected from hydrogen and $C_1$-$C_6$ alkyl, preferably selected from hydrogen, methyl, ethyl, propyl, and butyl.

According to some embodiments of the present invention, said styrene-based monomer is at least one of styrene, α-methylstyrene, or 4-butylstyrene, preferably styrene.

According to some embodiments of the present invention, said polyhedral oligomeric silsesquioxane is one or more of a vinyl-containing silsesquioxane, a hydrogen-containing polysilsesquioxane, an alkoxy-containing polysilsesquioxane, and an epoxy-containing polysilsesquioxane.

According to some embodiments of the present invention, said vinyl-containing silsesquioxane is octavinylsilsesquioxane.

According to some embodiments of the present invention, said cross-linking agent is one or more of ethylene glycol bismethacrylate, dipropenylbenzene, divinylphenylmethane, and divinylbenzene.

According to some embodiments of the present invention, said initiator is at least one of benzoyl peroxide, azodiisobutyronitrile, azodiisoheptylonitrile, lauroyl peroxide, and cumene hydroperoxide.

According to some embodiments of the present invention, in step S1, based on the total weight of the raw materials, the mass content of the styrene-based monomer is 85-95%.

According to some embodiments of the present invention, in step S1, based on the total weight of the raw materials, the mass content of said cross-linking agent is 1-6%.

According to some embodiments of the present invention, in step S1, based on the total weight of the raw materials, the mass content of said polyhedral oligomeric silsesquioxane is 0.1-10%, for example 0.1%, 0.2%, 0.5%, 1.0%, 1.2%, 1.5%, 2.0%, 2.5%, 3.0%, 3.5%, 4.0%, 4.3%, 4.5%, 5.0%, 5.5%, 6.0%, 7.0%, 8.0%, 9.1%, 9.5%, 10% and an arbitrary value in between.

According to some embodiments of the present invention, in step S1, based on the total weight of the raw materials, the mass content of said polyhedral oligomeric silsesquioxane is 0.2-5%.

According to some embodiments of the present invention, in step S1, based on the total weight of the raw materials, the mass content of said polyhedral oligomeric silsesquioxane is 2-5%.

According to some embodiments of the present invention, in step S1, based on the total weight of the raw materials, the mass content of said initiator is 0.1-5%.

According to some embodiments of the present invention, based on the parts by weight, the used amount of the styrene-based monomer is 85-95 parts, the used amount of the cross-linking agent is 2-5 parts, the used amount of the nano-material is 0.1-10 parts, and the used amount of the initiator is 0.1-5 parts.

In some preferred embodiments of the present invention, the process for preparing the catalyst comprises the following steps:

a) An auxiliary agent is formulated into an aqueous solution A having a concentration of 0.5-3% by weight, and a styrene-based monomer, a cross-linking agent, a nanomaterial, and an initiator are formulated into a solution B; wherein, said auxiliary agent is at least one of polyvinyl alcohol, gelatin, starch, methylcellulose, bentonite and calcium carbonate; said styrene-based monomer is at least one of styrene, α-methylstyrene and 4-butylstyrene; said cross-linking agent is at least one of ethylene glycol bismethacrylate, dipropenylbenzene, divinylphenylmethane, and divinylbenzene; said nano-material is at least one of a vinyl-containing silsesquioxane, a hydrogen-containing polysilsesquioxane, an alkoxy-containing polysilsesquioxane and an epoxy-containing polysilsesquioxane; said initiator is at least one of benzoyl peroxide, azodiisobutyronitrile, azodiisoheptylonitrile, lauroyl peroxide, and cumene hydroperoxide; based on the parts by weight, the used amount of the styrene-based monomer is 85-95 parts, the used amount of the cross-linking agent is 2-5 parts, the used amount of the nano-material is 0.1-10 parts, the used amount of the initiator is 0.1-5 parts; the used amount of the auxiliary agent is 150-400% of the used amount of the monomer;

b) The solution B and the solution A are combined, stirred at normal temperature for 1-3 hours, and mixed well; then polymerized at 60-75° C. for 0.5-5 hours, gradually warmed up to 70-90° C. and reacted for 5-15 hours, then warmed up to 90-100° C. and reacted for 5-15 hours; after the completion of the reaction, the reaction mixture is extracted, washed, filtered, dried and sieved to obtain composite microspheres with a particle size ranging from 0.35 to 0.60 mm;

c) To the composite microspheres are added a chloromethylation reagent equivalent to 200-500% of the weight of composite microspheres and a zinc chloride catalyst equivalent to 20-70% of the weight of composite microspheres, reacted at 30-60° C. for 8-30 hours, filtered and washed to obtain chloromethylated composite spheres; said chloromethylation reagent is at least one of chloromethyl ether, chloromethyl ethyl ether, and 1,4-dichloromethoxybutane;

d) the chloromethylated composite spheres and an N-alkylimidazole in a mixture are reacted at 60-90° C. for 10-48 hours, and after the completion of the reaction, filtered and washed to obtain imidazolated composite microspheres; in the mixture, the chloromethylated composite spheres, the N-alkylimidazole (e.g. N-methylimidazole) and a solvent (e.g. acetonitrile or N,N-dimethylformamide) can be 1:(1-5):(10-50);

f) the imidazolated composite microspheres are washed with a salt solution, after the completion of the washing, washed with deionized water to pH=7 to obtain the ion-exchange resin, wherein the molar ratio of the imidazolated composite microspheres to the salt solution is (1:1)-(1:10); the concentration of the salt solution is 0.1-1 mol/L; the salt solution is a salt solution containing at least one of a fluoride ion, a chloride ion, a bromide ion, an iodide ion, an acetate group, a formate group, and a bioxalate group.

According to the second aspect of the present invention, a method for an addition reaction of alkylene oxide and carbon dioxide comprises reacting alkylene oxide and carbon dioxide in the presence of the above catalyst.

According to some embodiments of the present invention, the alkylene oxide has a general formula of

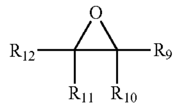

Wherein, $R_9$-$R_{12}$ are identical to or different from each other and each independently selected from hydrogen, $C_1$-$C_6$ alkyl, and $C_6$-$C_{10}$ aryl, preferably selected from hydrogen, methyl, ethyl, propyl, butyl, and phenyl.

According to some embodiments of the present invention, said alkylene oxide is selected from ethylene oxide, propylene oxide, and styrene oxide.

According to some embodiments of the present invention, the mass ratio of the catalyst to the alkylene oxide is (0.001-1):1, preferably (0.1-0.3):1.

According to some embodiments of the present invention, the reaction temperature is 60-180° C., for example, 60° C., 70° C., 80° C., 90° C., 100° C., 110° C., 120° C., 130° C., 140° C., 150° C., 160° C., 170° C., 180° C., and an arbitrary value in between.

According to some embodiments of the present invention, the reaction temperature is 100° C.-160° C.

According to some embodiments of the present invention, the reaction pressure is 0.1-10.0 MPa, for example, 0.1 MPa, 0.5 MPa, 1 MPa, 2 MPa, 3 MPa, 4 MPa, 5 MPa, 6 MPa, 7 MPa, 8 MPa, 9 MPa, 10 MPa, and an arbitrary value in between.

According to some embodiments of the present invention, said reaction pressure is 2-5 MPa.

According to some embodiments of the present invention, said reaction time is 1-8 hours, preferably 3-6 hours.

The nanocomposite ion-exchange resin catalyst of the present invention can be used in the addition reaction of alkylene oxide and carbon dioxide. The catalyst has high wear resistance, high swelling resistance, and high activity, the products after the reaction are easy to separate, and the catalyst can be used continuously many times.

BRIEF DESCRIPTION OF THE DRAWINGS

FIG. 1: Infrared spectrum of the ion-exchange resin of Example 1.

DETAILED DESCRIPTION

The present invention will be further described below through examples, but it should be pointed out that the protection scope of the present invention is not limited thereto, but is determined by the appended claims.

It should be particularly noted that two or more aspects (or embodiments) disclosed in the context of this specification can be combined with each other arbitrarily, and the technical solutions formed thereby belong to a part of the original disclosure of this specification, and also falls within the protection scope of the present invention.

Raw Materials:

- Styrene: analytically pure, purchased from Sinopharm, used after removing a polymerization inhibitor;
- Divinylbenzene: analytically pure, purchased from Sinopharm, used after removing a polymerization inhibitor;
- Octavinylsilsesquioxane: analytically pure, purchased from Sinopharm, used directly;
- Benzoyl peroxide: analytically pure, purchased from Sinopharm, used after recrystallization;
- Polyvinyl alcohol\gelatin: analytically pure, purchased from Sinopharm, used directly;
- Chloromethyl ether\chloromethyl ethyl ether\1,4-dichloromethoxybutane: analytically pure, purchased from Sinopharm, used directly;
- 1-methylimidazole\1-butylimidazole\imidazole: analytically pure, purchased from Sinopharm, used directly;
- Acetonitrile: analytically pure, purchased from Sinopharm, used directly;
- Other unmentioned reagents used in the examples are commercially available, and were analytically pure, purchased from Sinopharm, and used directly.

[Example 1] Preparation of Ion-Exchange Resin

To a 500 mL three-necked flask were added 65.0 g of styrene, 1.0 g of divinylbenzene, 3.0 g of octavinylsilsesquioxane, and 1.0 g of benzoyl peroxide, a stirrer was started, and the mixture was stirred for 0.5 hours; a mixed solution of 200 mL of deionized water and 4 g of polyvinyl alcohol was added, the mixture was stirred for 2 hours. Then, the mixture was gradually warmed up to 75° C. and reacted for 5 hours, then warmed up to 90° C. and reacted for 10 hours, and finally warmed up to 100° C. and reacted for 10 hours. After the completion of the reaction, the supernatant liquid was poured out, washed with hot water at 85° C., then washed with cold water, then filtered, put into an oven and dried at 80° C., sieved to collect composite microspheres A1 with a particle size in the range of 0.35-0.60 mm.

Chloromethylation of composite microspheres: To a 500 mL three-necked flask were added 40 g of composite microspheres A1 and 250 mL of chloromethyl ether; after standing for 3 hours at room temperature, the stirring was started; 10 g of zinc chloride was added as the catalyst; the mixture was warmed up to 60° C. and reacted for 10 hours, and then cooled to room temperature after the completion of the chloromethylation; the chlorination mother liquor was filtered out, washed with methanol repeatedly, and dried at 100° C. for 8 hours to obtain chloromethylated composite spheres A1.

Imidazolation: To a 500 mL three-necked flask were added 30 g of chloromethylated composite spheres A1 (having a chlorine content of 3.4 mmol Cl/g), 1-methylimidazole (102.0 mmol), and 200 mL of acetonitrile; the mixture was reacted at 60° C. for 24 hours, cooled to room temperature, filtered, washed with ethyl acetate, 0.1 mol/L HCl, deionized water, and methanol successively, and then dried under vacuum at 60° C. for 12 hours to obtain imidazolated composite microspheres A1.

Ion-exchange: To a 1000 mL three-necked flask were added 30 g of imidazolated composite microspheres A1, and 500 mL of a solution of NaBr in deionized water having a concentration of 0.1 mol/L; the mixture was stirred at room temperature to perform an ion-exchange reaction for 24 hours, then washed with deionized water until the pH of the washing liquor was 7, and dried under vacuum to obtain an ion-exchange resin catalyst, which was denoted as Cat-A1, and had the following structural formula:

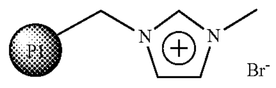

[Example 2] Preparation of Ion-Exchange Resin

To a 500 mL three-necked flask was added a monomer mixture solution containing an initiator (60.0 g of styrene, 1.0 g of divinylbenzene, 1.6 g of octavinylsilsesquioxane, and 1.0 g of benzoyl peroxide, this solution was firstly reacted under stirring at 70° C. for 0.5 hours), a stirrer was started, a mixed solution of 200 mL of deionized water and 4 g of polyvinyl alcohol was added, the mixture was warmed up to 85° C. and reacted for 3 hours, then warmed up to 90° C. and reacted for 9 hours, and finally warmed up to 100° C. and reacted for 10 hours. After the completion of the reaction, the supernatant liquid was poured out, washed with hot water at 85° C., then washed with cold water, then filtered, put into an oven and dried at 80° C., sieved to collect composite microspheres B1 with a particle size in the range of 0.35-0.60 mm.

Chloromethylation of composite microspheres: To a 500 mL three-necked flask were added 50 g of composite microspheres B1 and 200 mL of chloromethyl ethyl ether; after standing for 6 hours at room temperature, 30 g of zinc chloride was added as the catalyst and the stirring was started; the mixture was warmed up to 50° C. and reacted for 30 hours, and then cooled to room temperature after the completion of the chloromethylation; the chlorination mother liquor was filtered out, washed with methanol repeatedly, and dried at 100° C. for 8 hours to obtain chloromethylated composite spheres B1.

Imidazolation: To a 500 mL three-necked flask were added 50 g of chloromethylated composite spheres B1

(having a chlorine content of 4.6 mmol Cl/g), 1-methylimidazole (230.0 mmol), and 300 mL of acetonitrile; the mixture was reacted at 80° C. for 16 hours, cooled to room temperature, filtered, washed with ethyl acetate, 0.1 mol/L HCl, deionized water, and methanol successively, and then dried under vacuum at 60° C. for 12 hours to obtain imidazolated composite microspheres B 1.

Ion-exchange: To a 1000 mL three-necked flask were added 40 g of imidazolated composite microspheres B 1, and 400 mL of a solution of NaBr in deionized water having a concentration of 0.1 mol/L; the mixture was stirred at room temperature to perform an ion-exchange reaction for 12 hours, then washed with deionized water until the pH of the washing liquor was 7, and dried under vacuum to obtain an ion-exchange resin catalyst, which was denoted as Cat-B1, and had the following structural formula:

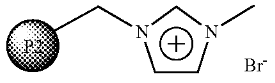

[Example 3] Preparation of Ion-Exchange Resin

To a 500 mL three-necked flask was added a monomer mixture solution containing an initiator (42.5 g of styrene, 2.5 g of divinylbenzene, 0.1 g of octavinylsilsesquioxane, and 2.0 g of benzoyl peroxide, this solution was firstly reacted under stirring at 70° C. for 1.5 hours), a mixed solution of 200 mL of deionized water and 4 g of polyvinyl alcohol was added, the mixture was warmed up to 85° C. and reacted for 3 hours, then warmed up to 90° C. and reacted for 9 hours, and finally warmed up to 100° C. and reacted for 10 hours. After the completion of the reaction, the supernatant liquid was poured out, washed with hot water at 85° C., then washed with cold water, then filtered, put into an oven and dried at 80° C., sieved to collect composite microspheres C1 with a particle size in the range of 0.35-0.60 mm.

Chloromethylation of composite microspheres: To a 250 mL three-necked flask were added 20 g of composite microspheres C1 and 100 mL of 1,4-dichloromethoxybutane; after standing for 6 hours at room temperature, 8 g of zinc chloride was added as the catalyst and the stirring was started; the mixture was warmed up to 30° C. and reacted for 12 hours, and then cooled to room temperature after the completion of the chloromethylation; the chlorination mother liquor was filtered out, washed with methanol repeatedly, and dried at 100° C. for 8 hours to obtain chloromethylated composite spheres C1.

Imidazolation: To a 250 mL three-necked flask were added 20 g of chloromethylated composite spheres C1 (having a chlorine content of 1.5 mmol Cl/g), 1-ethylimidazole (30.0 mmol), and 150 mL of acetonitrile; the mixture was reacted at 90° C. for 16 hours, cooled to room temperature, filtered, washed with ethyl acetate, 0.1 mol/L HCl, deionized water, and methanol successively, and then dried under vacuum at 60° C. for 12 hours to obtain imidazolated composite microspheres C1.

Ion-exchange: To a 500 mL three-necked flask were added 20 g of imidazolated composite microspheres C1, and 300 mL of a solution of NaBr in deionized water having a concentration of 0.5 mol/L; the mixture was stirred at room temperature to perform an ion-exchange reaction for 12 hours, then washed with deionized water until the pH of the washing liquor was 7, and dried under vacuum to obtain an ion-exchange resin catalyst, which was denoted as Cat-C1, and had the following structural formula:

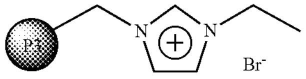

[Example 4] Preparation of Ion-Exchange Resin

To a 500 mL three-necked flask were added 47.0 g of styrene, 2.3 g of divinylbenzene, and 1.6 g of benzoyl peroxide (as an initiator); the mixture was reacted under stirring at 60° C. for 2.0 hours; then 0.6 g of octavinylsilsesquioxane was added, the stirring was continued for 1 hour to perform the pre-polymerization. 260 mL of a solution of 2.0 g of gelatin dissolved in deionized water was added. The stirring speed was adjusted, while the mixture was gradually warmed up to 80° C. and reacted for 5 hours; then warmed up to 90° C. and reacted for 5 hours, and finally warmed up to 98° C. and reacted for 6 hours. After the completion of the reaction, the supernatant liquid was poured out, washed with hot water at 85° C., then washed with cold water, then filtered, put into an oven and dried at 80° C., sieved to collect composite microspheres A2 with a particle size in the range of 0.35-0.60 mm.

Chloromethylation of composite microspheres: To a 500 mL three-necked flask were added 40 g of composite microspheres A2 and 250 mL of chloromethyl ether; after standing for 3 hours at room temperature, the stirring was started; 10 g of zinc chloride was added as the catalyst; the mixture was warmed up to 60° C. and reacted for 10 hours, and then cooled to room temperature after the completion of the chloromethylation; the chlorination mother liquor was filtered out, washed with methanol repeatedly, and dried at 100° C. for 8 hours to obtain chloromethylated composite spheres A2.

Imidazolation: To a 500 mL three-necked flask were added 30 g of chloromethylated composite spheres A2 (having a chlorine content of 3.6 mmol Cl/g), 1-methylimidazole (108.0 mmol), and 200 mL of acetonitrile; the mixture was reacted at 60° C. for 24 hours, cooled to room temperature, filtered, washed with ethyl acetate, 0.1 mol/L HCl, deionized water, and methanol successively, and then dried under vacuum at 60° C. for 12 hours to obtain imidazolated composite microspheres A2.

Ion-exchange: To a 1000 mL three-necked flask were added 30 g of imidazolated composite microspheres A2, and 500 mL of a solution of NaBr in deionized water having a concentration of 0.1 mol/L; the mixture was stirred at room temperature to perform an ion-exchange reaction for 24 hours, then washed with deionized water until the pH of the washing liquor was 7, and dried under vacuum to obtain an ion-exchange resin catalyst, which was denoted as Cat-A2, and had the following structural formula:

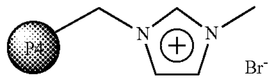

[Example 5] Preparation of Ion-Exchange Resin

To a 500 mL three-necked flask was added a monomer mixture solution containing an initiator (60.0 g of styrene, 1.0 g of divinylbenzene, 1.6 g of octavinylsilsesquioxane, and 1.0 g of benzoyl peroxide, this solution was firstly reacted under stirring at 70° C. for 0.5 hours), a stirrer was started, a mixed solution of 200 mL of deionized water and 4 g of polyvinyl alcohol was added, the mixture was warmed up to 85° C. and reacted for 3 hours, then warmed up to 90° C. and reacted for 9 hours, and finally warmed up to 100° C. and reacted for 10 hours. After the completion of the reaction, the supernatant liquid was poured out, washed with hot water at 85° C., then washed with cold water, then filtered, put into an oven and dried at 80° C., sieved to collect composite microspheres B2 with a particle size in the range of 0.35-0.60 mm.

Chloromethylation of composite microspheres: To a 500 mL three-necked flask were added 50 g of composite microspheres B2 and 200 mL of chloromethyl ethyl ether; after standing for 6 hours at room temperature, 30 g of zinc chloride was added as the catalyst and the stirring was started; the mixture was warmed up to 50° C. and reacted for 30 hours, and then cooled to room temperature after the completion of the chloromethylation; the chlorination mother liquor was filtered out, washed with methanol repeatedly, and dried at 100° C. for 8 hours to obtain chloromethylated composite spheres B2.

Imidazolation: To a 500 mL three-necked flask were added 50 g of chloromethylated composite spheres B2 (having a chlorine content of 4.7 mmol Cl/g), 1-butylimidazole (235.0 mmol), and 300 mL of acetonitrile; the mixture was reacted at 80° C. for 16 hours, cooled to room temperature, filtered, washed with ethyl acetate, 0.1 mol/L HCl, deionized water, and methanol successively, and then dried under vacuum at 60° C. for 12 hours to obtain imidazolated composite microspheres B2.

Ion-exchange: To a 1000 mL three-necked flask were added 40 g of imidazolated composite microspheres B2, and 400 mL of a solution of NaBr in deionized water having a concentration of 0.1 mol/L; the mixture was stirred at room temperature to perform an ion-exchange reaction for 12 hours, then washed with deionized water until the pH of the washing liquor was 7, and dried under vacuum to obtain an ion-exchange resin catalyst, which was denoted as Cat-B2, and had the following structural formula:

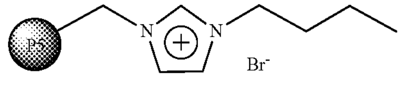

[Example 6] Preparation of Ion-Exchange Resin

To a 500 mL three-necked flask was added a monomer mixture solution containing an initiator (42.5 g of styrene, 2.5 g of divinylbenzene, 0.1 g of octavinylsilsesquioxane and 2.0 g of benzoyl peroxide, this solution was firstly reacted under stirring at 70° C. for 1.5 hours), a mixed solution of 200 mL of deionized water and 4 g of polyvinyl alcohol was added, the mixture was warmed up to 85° C. and reacted for 3 hours, then warmed up to 90° C. and reacted for 9 hours, and finally warmed up to 100° C. and reacted for 10 hours. After the completion of the reaction, the supernatant liquid was poured out, washed with hot water at 85° C., then washed with cold water, then filtered, put into an oven and dried at 80° C., sieved to collect composite microspheres C2 with a particle size in the range of 0.35-0.60 mm.

Chloromethylation of composite microspheres: To a 250 mL three-necked flask were added 20 g of composite microspheres C2 and 100 mL of 1,4-dichloromethoxybutane; after standing for 6 hours at room temperature, 8 g of zinc chloride was added as the catalyst and the stirring was started; the mixture was warmed up to 30° C. and reacted for 12 hours, and then cooled to room temperature after the completion of the chloromethylation; the chlorination mother liquor was filtered out, washed with methanol repeatedly, and dried at 100° C. for 8 hours to obtain chloromethylated composite spheres C2.

Imidazolation: To a 250 mL three-necked flask were added 20 g of chloromethylated composite spheres C2 (having a chlorine content of 1.6 mmol Cl/g), 1-methylimidazole (320 mmol), and 150 mL of acetonitrile; the mixture was reacted at 90° C. for 16 hours, cooled to room temperature, filtered, washed with ethyl acetate, 0.1 mol/L HCl, deionized water, and methanol successively, and then dried under vacuum at 60° C. for 12 hours to obtain imidazolated composite microspheres C2.

Ion-exchange: To a 500 mL three-necked flask were added 20 g of imidazolated composite microspheres C2, and 300 mL of a solution of NaBr in deionized water having a concentration of 0.5 mol/L; the mixture was stirred at room temperature to perform an ion-exchange reaction for 12 hours, then washed with deionized water until the pH of the washing liquor was 7, and dried under vacuum to obtain an ion-exchange resin catalyst, which was denoted as Cat-C2, and had the following structural formula:

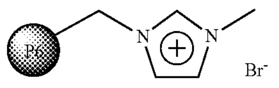

[Example 7] Preparation of Ion-Exchange Resin

To a 500 mL three-necked flask were added 65.0 g of styrene, 1.0 g of divinylbenzene, 0.07 g of octavinylsilsesquioxane and 1.0 g of benzoyl peroxide, a stirrer was started, and the mixture was stirred for 0.5 hours; a mixed solution of 200 mL of deionized water and 4 g of polyvinyl alcohol was added, the mixture was stirred for 2 hours. Then, the mixture was gradually warmed up to 75° C. and reacted for 5 hours, then warmed up to 90° C. and reacted for 10 hours, and finally warmed up to 100° C. and reacted for 10 hours. After the completion of the reaction, the supernatant liquid was poured out, washed with hot water at 85° C., then washed with cold water, then filtered, put into an oven and dried at 80° C., sieved to collect composite microspheres A3 with a particle size in the range of 0.35-0.60 mm.

Chloromethylation of composite microspheres: To a 500 mL three-necked flask were added 40 g of composite microspheres A3 and 250 mL of chloromethyl ether; after standing for 3 hours at room temperature, the stirring was started; 10 g of zinc chloride was added as the catalyst; the mixture was warmed up to 60° C. and reacted for 10 hours, and then cooled to room temperature after the completion of the chloromethylation; the chlorination mother liquor was filtered out, washed with methanol repeatedly, and dried at 100° C. for 8 hours to obtain chloromethylated composite spheres A3.

Imidazolation: To a 500 mL three-necked flask were added 30 g of chloromethylated composite spheres A3 (having a chlorine content of 3.4 mmol Cl/g), 1-methylimidazole (102.0 mmol), and 200 mL of acetonitrile; the mixture was reacted at 60° C. for 24 hours, cooled to room temperature, filtered, washed with ethyl acetate, 0.1 mol/L HCl, deionized water, and methanol successively, and then dried under vacuum at 60° C. for 12 hours to obtain imidazolated composite microspheres A3.

Ion-exchange: To a 1000 mL three-necked flask were added 30 g of imidazolated composite microspheres A3, and 500 mL of a solution of NaBr in deionized water having a concentration of 0.1 mol/L; the mixture was stirred at room temperature to perform an ion-exchange reaction for 24 hours, then washed with deionized water until the pH of the washing liquor was 7, and dried under vacuum to obtain an ion-exchange resin catalyst, which was denoted as Cat-A3, and had the following structural formula:

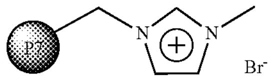

[Example 8] Preparation of Ion-Exchange Resin

To a 500 mL three-necked flask were added 65.0 g of styrene, 1.0 g of divinylbenzene, 7.5 g of octavinylsilsesquioxane and 1.0 g of benzoyl peroxide, a stirrer was started, and the mixture was stirred for 0.5 hours; a mixed solution of 200 mL of deionized water and 4 g of polyvinyl alcohol was added, the mixture was stirred for 2 hours. Then, the mixture was gradually warmed up to 75° C. and reacted for 5 hours, then warmed up to 90° C. and reacted for 10 hours, and finally warmed up to 100° C. and reacted for 10 hours. After the completion of the reaction, the supernatant liquid was poured out, washed with hot water at 85° C., then washed with cold water, then filtered, put into an oven and dried at 80° C., sieved to collect composite microspheres A5 with a particle size in the range of 0.35-0.60 mm.

Chloromethylation of composite microspheres: To a 500 mL three-necked flask were added 40 g of composite microspheres A4 and 250 mL of chloromethyl ether; after standing for 3 hours at room temperature, the stirring was started; 10 g of zinc chloride was added as the catalyst; the mixture was warmed up to 60° C. and reacted for 10 hours, and then cooled to room temperature after the completion of the chloromethylation; the chlorination mother liquor was filtered out, washed with methanol repeatedly, and dried at 100° C. for 8 hours to obtain chloromethylated composite spheres A4.

Imidazolation: To a 500 mL three-necked flask were added 30 g of chloromethylated composite spheres A4 (having a chlorine content of 3.4 mmol Cl/g), 1-methylimidazole (102.0 mmol), and 200 mL of acetonitrile; the mixture was reacted at 60° C. for 24 hours, cooled to room temperature, filtered, washed with ethyl acetate, 0.1 mol/L HCl, deionized water, and methanol successively, and then dried under vacuum at 60° C. for 12 hours to obtain imidazolated composite microspheres A4.

Ion-exchange: To a 1000 mL three-necked flask were added 30 g of imidazolated composite microspheres A4, and 500 mL of a solution of NaBr in deionized water having a concentration of 0.1 mol/L; the mixture was stirred at room temperature to perform an ion-exchange reaction for 24 hours, then washed with deionized water until the pH of the washing liquor was 7, and dried under vacuum to obtain an ion-exchange resin catalyst, which was denoted as Cat-A4, and had the following structural formula:

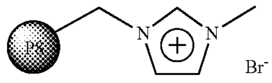

[Example 9] Preparation of Ion-Exchange Resin

To a 500 mL three-necked flask were added 65.0 g of styrene, 1.0 g of divinylbenzene, 11.8 g of octavinylsilsesquioxane, and 1.0 g of benzoyl peroxide, a stirrer was started, and the mixture was stirred for 0.5 hours; a mixed solution of 200 mL of deionized water and 4 g of polyvinyl alcohol was added, the mixture was stirred for 2 hours. Then, the mixture was gradually warmed up to 75° C. and reacted for 5 hours, then warmed up to 90° C. and reacted for 10 hours, and finally warmed up to 100° C. and reacted for 10 hours. After the completion of the reaction, the supernatant liquid was poured out, washed with hot water at 85° C., then washed with cold water, then filtered, put into an oven and dried at 80° C., sieved to collect composite microspheres A5 with a particle size in the range of 0.35-0.60 mm.

Chloromethylation of composite microspheres: To a 500 mL three-necked flask were added 40 g of composite microspheres A5 and 250 mL of chloromethyl ether; after standing for 3 hours at room temperature, the stirring was started; 10 g of zinc chloride was added as the catalyst; the mixture was warmed up to 60° C. and reacted for 10 hours, and then cooled to room temperature after the completion of the chloromethylation; the chlorination mother liquor was filtered out, washed with methanol repeatedly, and dried at 100° C. for 8 hours to obtain chloromethylated composite spheres A5.

Imidazolation: To a 500 mL three-necked flask were added 30 g of chloromethylated composite spheres A5 (having a chlorine content of 3.4 mmol Cl/g), 1-methylimidazole (102.0 mmol), and 200 mL of acetonitrile; the mixture was reacted at 60° C. for 24 hours, cooled to room temperature, filtered, washed with ethyl acetate, 0.1 mol/L HCl, deionized water, and methanol successively, and then dried under vacuum at 60° C. for 12 hours to obtain imidazolated composite microspheres A5.

Ion-exchange: To a 1000 mL three-necked flask were added 30 g of imidazolated composite microspheres A5, and 500 mL of a solution of NaBr in deionized water having a concentration of 0.1 mol/L; the mixture was stirred at room temperature to perform an ion-exchange reaction for 24 hours, then washed with deionized water until the pH of the washing liquor was 7, and dried under vacuum to obtain an ion-exchange resin catalyst, which was denoted as Cat-A5, and had the following structural formula:

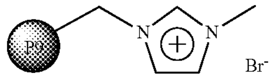

[Comparative Example 10] Preparation of Ion-Exchange Resin

To a 500 mL three-necked flask were added 65.0 g of styrene, 1.0 g of divinylbenzene, and 1.0 g of benzoyl peroxide, a stirrer was started, and the mixture was stirred for 0.5 hours; a mixed solution of 200 mL of deionized water and 4 g of polyvinyl alcohol was added, the mixture was stirred for 2 hours. Then, the mixture was gradually warmed up to 75° C. and reacted for 5 hours, then warmed up to 90° C. and reacted for 10 hours, and finally warmed up to 100° C. and reacted for 10 hours. After the completion of the reaction, the supernatant liquid was poured out, washed with hot water at 85° C., then washed with cold water, then filtered, put into an oven and dried at 80° C., sieved to collect microspheres A6 with a particle size in the range of 0.35-0.60 mm.

Chloromethylation of microspheres: To a 500 mL three-necked flask were added 40 g of microspheres A6 and 250 mL of chloromethyl ether; after standing for 3 hours at room temperature, the stirring was started; 10 g of zinc chloride was added as the catalyst; the mixture was warmed up to 60° C. and reacted for 10 hours, and then cooled to room temperature after the completion of the chloromethylation; the chlorination mother liquor was filtered out, washed with methanol repeatedly, and dried at 100° C. for 8 hours to obtain chloromethylated spheres A6.

Imidazolation: To a 500 mL three-necked flask were added 30 g of chloromethylated spheres A6 (having a chlorine content of 3.4 mmol Cl/g), 1-methylimidazole (102.0 mmol), and 200 mL of acetonitrile; the mixture was reacted at 60° C. for 24 hours, cooled to room temperature, filtered, washed with ethyl acetate, 0.1 mol/L HCl, deionized water, and methanol successively, and then dried under vacuum at 60° C. for 12 hours to obtain imidazolated microspheres A6.

Ion-exchange: To a 1000 mL three-necked flask were added 30 g of imidazolated microspheres A6, and 500 mL of a solution of NaBr in deionized water having a concentration of 0.1 mol/L; the mixture was stirred at room temperature to perform an ion-exchange reaction for 24 hours, then washed with deionized water until the pH of the washing liquor was 7, and dried under vacuum to obtain an ion-exchange resin catalyst, which was denoted as Cat-A6, and had the following structural formula:

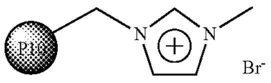

[Comparative Example 11] Preparation of Ion-Exchange Resin

To a 500 mL three-necked flask were added 65.0 g of styrene, 1.0 g of divinylbenzene, and 1.0 g of benzoyl peroxide, a stirrer was started, and the mixture was stirred for 0.5 hours; a mixed solution of 200 mL of deionized water and 4 g of polyvinyl alcohol was added, the mixture was stirred for 2 hours. Then, the mixture was gradually warmed up to 75° C. and reacted for 5 hours, then warmed up to 90° C. and reacted for 10 hours, and finally warmed up to 100° C. and reacted for 10 hours. After the completion of the reaction, the supernatant liquid was poured out, washed with hot water at 85° C., then washed with cold water, then filtered, put into an oven and dried at 80° C., sieved to collect microspheres A7 with a particle size in the range of 0.35-0.60 mm.

Chloromethylation of microspheres: To a 500 mL three-necked flask were added 40 g of microspheres A7 and 250 mL of chloromethyl ether; after standing for 3 hours at room temperature, the stirring was started; 10 g of zinc chloride was added as the catalyst; the mixture was warmed up to 60° C. and reacted for 10 hours, and then cooled to room temperature after the completion of the chloromethylation; the chlorination mother liquor was filtered out, washed with methanol repeatedly, and dried at 100° C. for 8 hours to obtain chloromethylated spheres A7.

Imidazolation: To a 500 mL three-necked flask were added 30 g of chloromethylated spheres A7 (having a chlorine content of 3.4 mmol Cl/g), imidazole (102.0 mmol), and 200 mL of acetonitrile; the mixture was reacted at 80° C. for 24 hours, cooled to room temperature, filtered, washed with ethyl acetate, 0.1 mol/L HCl, deionized water, and methanol successively, and then dried under vacuum at 60° C. for 12 hours to obtain imidazole microspheres A7.

POSS-incorporated: To a 500 mL three-necked flask were added 30 g of imidazole microspheres A7 (having an imidazole group content of 3.1 mmol/g), 9.3 g of octachloromethyl silsesquioxane, and 300 mL of tetrahydrofuran; the mixture was reacted at 100° C. for 24 hours, filtered after the reaction, washed with tetrahydrofuran and deionized water successively to obtain imidazole/POSS microspheres A7.

Ion-exchange: To a 1000 mL three-necked flask were added 30 g of imidazole/POSS microspheres A7, and 500 mL of a solution of NaBr in deionized water having a concentration of 0.1 mol/L; the mixture was stirred at room temperature to perform an ion-exchange reaction for 24 hours, then washed with deionized water until the pH of the washing liquor was 7, and dried under vacuum to obtain an ion-exchange resin catalyst, which was denoted as Cat-A7, and had the following structural formula:

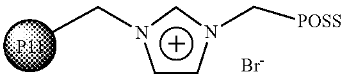

Example 12

The ion-exchange resin prepared in [Example 1] was used for the addition reaction of alkylene oxide and carbon dioxide. The experimental conditions were as follows: under the protection of high-purity nitrogen, to a 300 mL autoclave were added 50.0 g of ethylene oxide and 7.5 g of resin catalyst Cat-A1, filled with $CO_2$ at 1.0 MPa, warmed up to 120° C., refilled with $CO_2$ to maintain the reaction pressure at 2.0 MPa, reacted for 4 hours and filtered to remove the catalyst. As measured, the ethylene oxide conversion $C_{EO}$ was 96.7%, and the ethylene carbonate selectivity $S_{EC}$ was 99.3%.

Examples 13-27

The type of the resin catalyst and the reaction temperature and pressure were changed, and other reaction conditions were identical to those in [Example 12]. The catalytic reaction of ethylene oxide and carbon dioxide was performed and the analysis results after the reaction were shown in Table 1.

TABLE 1

| Ex. | Catalyst | Catalyst Amount/g | Temp/° C. | Time/h | Reaction Pressure/MPa | $C_{EO}$, % | $S_{EC}$, % |
|---|---|---|---|---|---|---|---|
| 12 | Cat-A2 | 7.5 | 120 | 4 | 2.0 | 96.9 | 99.2 |
| 13 | Cat-B1 | 7.5 | 120 | 4 | 2.0 | 95.5 | 98.9 |
| 14 | Cat-B2 | 7.5 | 120 | 4 | 2.0 | 95.7 | 99.1 |
| 15 | Cat-C1 | 7.5 | 120 | 4 | 2.0 | 95.3 | 99.3 |
| 16 | Cat-C2 | 7.5 | 120 | 4 | 2.0 | 95.6 | 98.9 |
| 17 | Cat-A3 | 7.5 | 120 | 4 | 2.0 | 92.9 | 98.9 |
| 18 | Cat-A4 | 7.5 | 120 | 4 | 2.0 | 94.6 | 98.7 |
| 19 | Cat-A5 | 7.5 | 120 | 4 | 2.0 | 92.8 | 98.5 |
| 20 | Cat-A6 | 7.5 | 120 | 4 | 2.0 | 89.5 | 98.6 |
| 21 | Cat-A7 | 7.5 | 120 | 4 | 2.0 | 80.3 | 95.1 |
| 22 | Cat-A1 | 7.5 | 160 | 4 | 2.0 | 99.4 | 99.3 |
| 23 | Cat-A1 | 7.5 | 100 | 4 | 2.0 | 94.5 | 99.2 |
| 24 | Cat-A1 | 7.5 | 180 | 4 | 2.0 | 99.4 | 99.3 |
| 25 | Cat-A1 | 7.5 | 120 | 4 | 0.1 | 20.2 | 98.6 |
| 26 | Cat-A1 | 7.5 | 120 | 4 | 5 | 96.8 | 99.2 |
| 27 | Cat-A1 | 7.5 | 120 | 4 | 10.0 | 95.5 | 99.1 |

Example 28

The catalyst Cat-A1 used in [Example 12] was filtered, washed, and dried, and then the catalytic reactions of ethylene oxide and carbon dioxide were performed according to the reaction steps and conditions in [Example 12]. The results for which the catalysts were used in two circulations were shown in Table 2. By analogy, the catalytic reactions in which the catalysts were used in 3-5 circulations were performed respectively, and the results were shown in Table 2.

TABLE 2

| Circulation Number | $C_{EO}$ % | $S_{EC}$ % |
|---|---|---|
| 2 | 95.6 | 99.0 |
| 3 | 95.9 | 99.1 |
| 4 | 95.5 | 99.2 |
| 5 | 95.3 | 98.9 |

Examples 29-32

The catalyst prepared in [Example 1] was used for the addition reaction of other alkylene oxides and carbon dioxide. The experimental conditions were as follows: under the protection of high-purity nitrogen, to a 300 mL autoclave were added 50.0 g of alkylene oxide and 7.5 g of resin catalyst, filled with $CO_2$ at 1.0 MPa, warmed up to 120° C., refilled with $CO_2$ to maintain the reaction pressure at 2.0 MPa, reacted for 4 hours and filtered to remove the catalyst. The alkylene oxide conversion and the obtained carbonate selectivity were measured. The results were shown in Table 3.

TABLE 3

| Examples | Alkylene Oxide | Catalyst | Catalyst Amount/g | Temp/° C. | Time/hr | Reaction Pressure/MPa | $C_{on}$, % | $S_{ec}$, % |
|---|---|---|---|---|---|---|---|---|
| 29 | Propylene oxide | Cat-A1 | 7.5 | 120 | 4 | 2.0 | 93.5 | 98.5 |
| 30 | Styrene oxide | Cat-A1 | 7.5 | 120 | 4 | 2.0 | 60.3 | 98.5 |
| 31 | Propylene oxide | Cat-B1 | 7.5 | 120 | 4 | 2.0 | 90.2 | 99.0 |
| 32 | Styrene oxide | Cat-B1 | 7.5 | 120 | 4 | 2.0 | 56.5 | 99.1 |

Reference Example 1

According to the preparation method disclosed in the article of Catal. Sci. Technol., 2014, 4, 1598-1607, the catalyst $SiO_2$-ethane-Br was prepared. That catalyst was used for the addition reaction of styrene oxide and carbon dioxide. The experimental conditions were as follows: under the protection of high-purity nitrogen, to a 300 mL autoclave were added 50.0 g of styrene oxide and 7.5 g of catalyst, filled with $CO_2$ at 1.0 MPa, warmed up to 120° C., refilled with $CO_2$ to maintain the reaction pressure at 2.0 MPa, reacted for 4 hours and filtered to remove the catalyst. The styrene oxide conversion and the obtained cyclic styrene carbonate selectivity were measured. The results were shown in Table 4.

Reference Example 2

According to the preparation method disclosed in the article of Catalysis Today 2013, 200, 117-124, the catalyst SBA-15-IL3Br was prepared. That catalyst was used for the addition reaction of propylene oxide and carbon dioxide. The experimental conditions were as follows: under the protection of high-purity nitrogen, to a 300 mL autoclave were added 50.0 g of propylene oxide and 7.5 g of catalyst, filled with $CO_2$ at 1.0 MPa, warmed up to 120° C., refilled with $CO_2$ to maintain the reaction pressure at 2.0 MPa, reacted for 4 hours and filtered to remove the catalyst. The propylene oxide conversion and the obtained propylene carbonate selectivity were measured. The results were shown in Table 4.

Reference Example 3

According to the preparation method disclosed in the article of Green Chem., 2013, 15, 1584-1589, the catalyst Poly[bvbim]Cl was prepared. That catalyst was used for the addition reaction of styrene oxide and carbon dioxide. The experimental conditions were as follows: under the protection of high-purity nitrogen, to a 300 mL autoclave were added 50.0 g of styrene oxide and 7.5 g of catalyst, filled with $CO_2$ at 1.0 MPa, warmed up to 120° C., refilled with $CO_2$ to maintain the reaction pressure at 2.0 MPa, reacted for 4 hours and filtered to remove the catalyst. The styrene oxide conversion and the obtained cyclic styrene carbonate selectivity were measured. The results were shown in Table 4.

TABLE 4

| Reference Example | Alkylene oxide | Catalyst | Catalyst Amount/g | Temp/° C. | Time/hr | Reaction Pressure/MPa | $C_{on}$, % | $S_{ec}$, % |
|---|---|---|---|---|---|---|---|---|
| 1 | Styrene oxide | $SiO_2$-ethane-Br | 7.5 | 120 | 4 | 2.0 | 42.1 | 98.6 |
| 2 | Propylene oxide | SBA-15-IL3Br | 7.5 | 120 | 4 | 2.0 | 73.5 | 97.0 |
| 3 | Styrene oxide | Poly[bvbim]Cl | 7.5 | 120 | 4 | 2.0 | 24.9 | 98.5 |

Example 33: Determination for Sphericity after Osmotic Attrition 1. 16 mL of a sample was weighed and transferred to an organic glass exchange column, 25 mL of pure water was added; a solution of sodium hydroxide in deionized water (25 mL, 1 mol/L) was quickly poured and drained off within 10-15 seconds, the operation was repeated 5 times; then a solution of sodium hydroxide in deionized water (20 mL, 1 mol/L), no bubble was in the resin layer, 250 mL of pure water was added, and the deionized water was allowed to flow out evenly within 5 minutes;
2. According to the method of (1), the sample was treated with a solution of HCl in deionized water (1 mol/L);
3. To 15 mL of the above-treated sample was added a certain amount of deionized water so that the total volume was 50 mL, the mixture was transferred to a rotary drum, 10 ceramic balls were added, and the drum cover was tightened;
4. The rotary drum was placed on a ball mill, and the resin was rotated at a speed of 125 r/min for 20 minutes;
5. the treated resin was transferred to a screen cloth with pure water, and dried at 60° C. for 2-3 hours until the particles can roll freely;
6. The dried sample was placed in an enamel tray, the tray was slightly inclined to allow the spherical particles to roll down, and the broken particles were brushed to the upper right corner. The sample was divided into two parts, i.e., the spherical particles and the broken particles. For each of two parts, the residual amount of another sample less than 50 particles means that the separation was complete;
7. The masses of spherical particles and broken particles were respectively measured, and denoted as m1 and m2;
8. Sphericity after osmotic attrition S=m1/(m1+m2)×100.

Example 34: Determination of Sphericity after Attrition 1. 50 mL of an original sample was taken, and 5 mL of pure water was present on the resin layer;
2. The resin was transferred to a rotary drum by using 145 mL of pure water, 10 ceramic balls were added, and the drum cover was tightened;
3. The rotary drum was placed on a ball mill, and the resin was rotated at a speed of 125 r/min for 30 minutes;
4. the treated resin was transferred to a screen cloth with pure water, and dried at 60° C. for 2-3 hours until the particles can roll freely;
5. The dried sample was placed in an enamel tray, the tray was slightly inclined to allow the spherical particles to roll down, and the broken particles were brushed to the upper right corner. The sample was divided into two parts, i.e., the spherical particles and the broken particles. For each of two parts, the residual amount of another sample less than 50 particles means that the separation was complete;
6. The masses of spherical particles and broken particles were respectively measured, and denoted as m3 and m4;
7. Sphericity after attrition A=m3/(m3+m4)×100.

The catalyst of the present invention (Cat A1) had sphericity after attrition of 65.3%, and sphericity after osmotic attrition of 37.6%. The CNT-based catalyst (with reference to CN109569717A) had sphericity after attrition of 54.2% and sphericity after osmotic attrition of 25.5%.

The above experimental data showed that the nanocomposite resin catalyst of the present invention had higher strength.

Example 35: Determination for Swelling Ratio

Determination for Swelling Ratio:

1. A certain volume of the catalyst was transferred to an organic glass exchange column, and the volume of the catalyst was recorded as V1;
2. A certain amount of deionized water was poured into an organic-glass exchange column, and 5 mL of pure water was present on the resin layer;
3. After standing at room temperature for 24 hours, the volume of the swelled catalyst was recorded, denoted as V2;
4. The swelling ratio of the catalyst was calculated, S=(V2−V1)/V1×100%.

| Catalyst | Swelling Ratio (%) |
|---|---|
| Cat-A6 (Comparative Example) | 25.4 |
| Cat-A1 | 33.2 |
| CNT-based catalyst | 27.6 |

It should be noted that the above-mentioned embodiments are only used to explain the present invention, and do not constitute any limitation to the present invention. The present invention has been described with reference to exemplary embodiments, but it is to be understood that the words used therein are words of description and explanation, rather than words of limitation. The present invention may be modified within the scope of the claims of the present invention as specified and may be modified without departing from the scope and spirit of the present invention. Although the present invention described herein refers to the specific methods, materials, and embodiments, it is not intended to be limited to the specific examples disclosed therein, but rather, the present invention extends to all other methods and applications having the same function.

The invention claimed is:

1. A catalyst for addition reaction of alkylene oxide, comprising a nanocomposite ion-exchange resin having a structural formula of P-$Im^+$-$M^-$, wherein P is a nanocomposite resin matrix, $Im^+$ is a cation derived from 5-6 membered heterocycle containing at least one nitrogen atom, $M^-$ is an anion, wherein the nanocomposite resin matrix comprises a repeating unit represented by formula I and a repeating unit of —CH(POSS)—$CH_2$—, Formula I

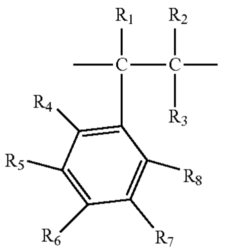

in formula I, $R_1$-$R_8$ are identical to or different from each other, and each independently selected from hydrogen and $C_1$-$C_6$ alkyl;

POSS is a polyhedral oligomeric silsesquioxane, which has a general formula of (—$SiO_{1.5}$)m, and m is 6, 8, 10, or 12.

2. The catalyst according to claim 1, wherein the catalyst comprises the following structure:

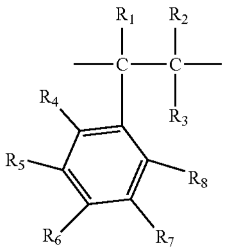

wherein $R_1$-$R_3$ are identical to or different from each other, and each independently selected from hydrogen and $C_1$-$C_6$ alkyl;

$R_4$-$R_8$ are each independently selected from hydrogen, $C_1$-$C_6$ alkyl, and $CH_2Im^+$-$M^-$, and at least one of $R_4$-$R_8$ is $CH_2Im^+$-$M^-$.

3. The catalyst according to claim 2, wherein $R_4$-$R_8$ are each independently selected from hydrogen and $CH_2Im^+$-$M^-$, and at least one of $R_4$-$R_8$ is $CH_2Im^+$-$M^-$.

4. The catalyst according to claim 1, wherein said M is one or more of halide ions and organic acid radical ions;

and/or, a mass content of POSS in the nanocomposite resin matrix P is 0.1-10%.

5. The catalyst according to claim 4, wherein the mass content of POSS in the nanocomposite resin matrix P is 0.2-5%.

6. The catalyst according to claim 4, wherein the mass content of POSS in the nanocomposite resin matrix P is 2-5%.

7. The catalyst according to claim 1, wherein $Im^+$ is an imidazolium cation, pyrazolium cation, pyrrolidinium cation, piperidinium cation, piperazinium cation, pyrimidinium cation, pyrazinium cation, pyridazinium cation, or triazinium cation.

8. The catalyst according to claim 1, wherein the $C_1$-$C_6$ alkyl is hydrogen, methyl, ethyl, propyl, or butyl.

9. The catalyst according to claim 1, wherein the M is one or more of a fluoride ion, a chloride ion, a bromide ion, an iodide ion, an acetate group, a formate group, and a bioxalate group.

10. The catalyst according to claim 1, wherein $Im^+$ is a cation derived from 5-6 membered heteroarene containing at least one nitrogen atom.

11. A process for preparing a catalyst as claimed in claim 1, comprising the following steps:

S1: polymerizing a styrene-based monomer, a cross-linking agent, and a polyhedral oligomeric silsesquioxane in the presence of an initiator to obtain a nanocomposite resin matrix P;

S2: subjecting the nanocomposite resin matrix P obtained in step S1 to a chloromethylation reaction, an imidazolation reaction, and an ion-exchange reaction.

12. The process according to claim 11, wherein said styrene-based monomer is one or more of styrene-based monomers represented by formula II;

Formula II

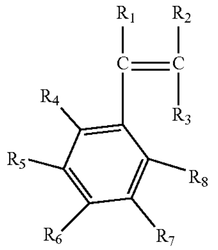

in formula II, $R_1$-$R_8$ are identical to or different from each other, and each independently selected from hydrogen and $C_1$-$C_6$ alkyl;

and/or, said polyhedral oligomeric silsesquioxane is one or more of a vinyl-containing silsesquioxane, a hydrogen-containing polysilsesquioxane, an alkoxy-containing polysilsesquioxane, and an epoxy-containing polysilsesquioxane;

and/or, said cross-linking agent is one or more of ethylene glycol bismethacrylate, dipropenylbenzene, divinylphenylmethane, and divinylbenzene;

and/or, said initiator is at least one of benzoyl peroxide, azodiisobutyronitrile, azodiisoheptylonitrile, lauroyl peroxide, and cumene hydroperoxide, and/or, in step S1, based on the total weight of raw materials, a mass of said styrene-based monomer is 85-95%, a mass of the cross-linking agent is 1-6%, a mass of said polyhedral oligomeric silsesquioxane is 0.1-10%, and a mass of the initiator is 0.1-5%.

13. The method according to claim 12, wherein the vinyl-containing silsesquioxane is an octavinylsilsesquioxane.

14. A method for an addition reaction of alkylene oxide and carbon dioxide, which comprises reacting alkylene oxide and carbon dioxide in the presence of the catalyst according to claim 1.

15. The method according to claim 14, wherein the alkylene oxide has a general formula of

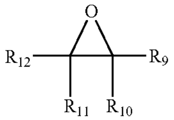

wherein, $R_9$-$R_{12}$ are identical to or different from each other and each independently selected from hydrogen, $C_1$-$C_6$ alkyl, and $C_6$-$C_{10}$ aryl; and/or, a mass ratio of the catalyst to the alkylene oxide is (0.001-1):1.

16. The method according to claim 15, wherein the $C_6$-$C_{10}$ aryl is phenyl.

17. The method according to claim 14, wherein a reaction temperature is 60-180° C.; and/or a reaction pressure is 0.1-10.0 MPa; and/or, a reaction time is 1-8 hours.

18. A method for an addition reaction of alkylene oxide and carbon dioxide, which comprises reacting alkylene oxide and carbon dioxide in the presence of a catalyst prepared with the method according to claim 11.

* * * * *